(12) United States Patent
Sato

(10) Patent No.: US 8,434,689 B2
(45) Date of Patent: May 7, 2013

(54) SEMICONDUCTOR MEMORY DEVICE

(75) Inventor: Keisuke Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/419,851

(22) Filed: Mar. 14, 2012

(65) Prior Publication Data

US 2013/0020395 A1    Jan. 24, 2013

(30) Foreign Application Priority Data

Jul. 19, 2011  (JP) ................................. 2011-158276

(51) Int. Cl.
*G06K 19/06* (2006.01)

(52) U.S. Cl.
USPC .......................................... 235/492; 235/451

(58) Field of Classification Search .................. 235/451, 235/492
See application file for complete search history.

(56) References Cited

U.S. PATENT DOCUMENTS

| | | | |
|---|---|---|---|
| 8,225,010 B2 * | 7/2012 | Tsujii | 710/16 |
| 2006/0192653 A1 * | 8/2006 | Atkinson et al. | 340/5.61 |
| 2007/0194945 A1 * | 8/2007 | Atkinson | 340/825.72 |
| 2008/0090527 A1 * | 4/2008 | Atkinson et al. | 455/70 |
| 2010/0235575 A1 * | 9/2010 | Yasaki et al. | 711/115 |
| 2011/0153874 A1 * | 6/2011 | Tsujii | 710/16 |

FOREIGN PATENT DOCUMENTS

| | | |
|---|---|---|
| JP | 2006-318217 | 11/2006 |
| JP | 2006-323583 | 11/2006 |
| JP | 2007-188325 | 7/2007 |
| JP | 2007-299338 | 11/2007 |
| JP | 2007-334468 | 12/2007 |
| JP | 2010-211700 | 9/2010 |

\* cited by examiner

*Primary Examiner* — Tuyen K Vo
(74) *Attorney, Agent, or Firm* — Oblon, Spivak, McClelland, Maier & Neustadt, L.L.P.

(57) ABSTRACT

According to embodiments, a semiconductor memory device capable of transmission and reception of information by wireless communication is provided. The semiconductor memory device includes a radio antenna for performing the wireless communication, a nonvolatile semiconductor memory element that stores information to be transmitted and received via the radio antenna, a substrate on which the nonvolatile semiconductor memory element is mounted and a wiring pattern to be connected to the nonvolatile semiconductor memory element is formed, and a switching unit that switches between a state where the wireless communication is permitted and a state where the wireless communication is rejected.

19 Claims, 10 Drawing Sheets

SEMICONDUCTOR MEMORY DEVICE

CROSS-REFERENCE TO RELATED APPLICATIONS

This application is based upon and claims the benefit of priority from Japanese Patent Application No. 2011-158276, filed on Jul. 19, 2011; the entire contents of which are incorporated herein by reference.

FIELD

Embodiments described herein relate generally to a semiconductor memory device.

BACKGROUND

Semiconductor memory devices including a nonvolatile semiconductor memory element, such as a NAND flash memory, are used. Semiconductor memory devices are, for example, used as an external memory that is mounted on a host apparatus, such as a digital camera, and stores information such as imaging data. Recently, there is a semiconductor memory device that can perform transmission and reception of information by wireless communication to and from a different host apparatus, such as a personal computer, without removing the semiconductor memory device from a digital camera or the like.

DETAILED DESCRIPTION

In general, according to one embodiment, a semiconductor memory device capable of transmission and reception of information by wireless communication is provided. The semiconductor memory device includes a radio antenna for performing the wireless communication, a nonvolatile semiconductor memory element that stores information to be transmitted and received via the radio antenna, a substrate on which the a nonvolatile semiconductor memory element is mounted and a wiring pattern to be connected to the a nonvolatile semiconductor memory element is formed, and a switching unit that switches between a state where the wireless communication is permitted and a state where the wireless communication is rejected.

Exemplary embodiments of a semiconductor memory device will be explained below in detail with reference to the accompanying drawings. The present invention is not limited to the following embodiments.

Figure 1:
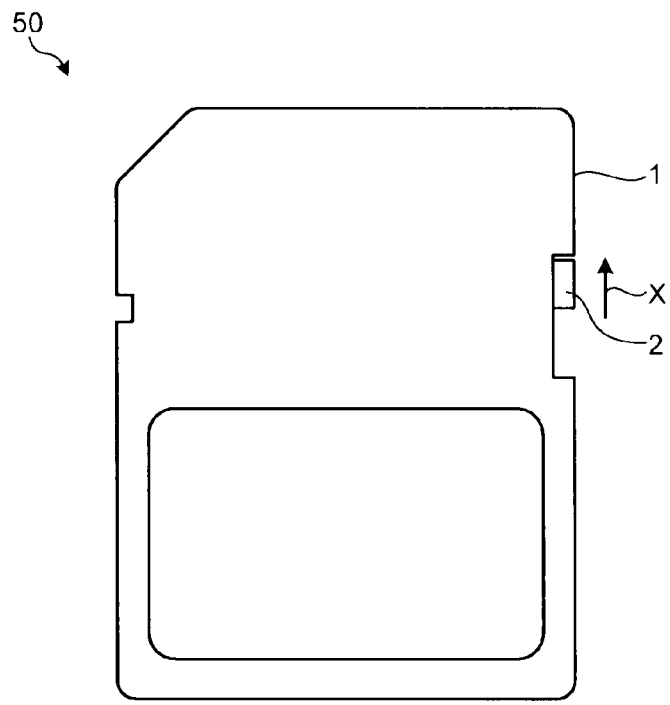
FIG. 1 is a plan view illustrating a schematic configuration of a semiconductor memory device according to a first embodiment.
Figure 2:
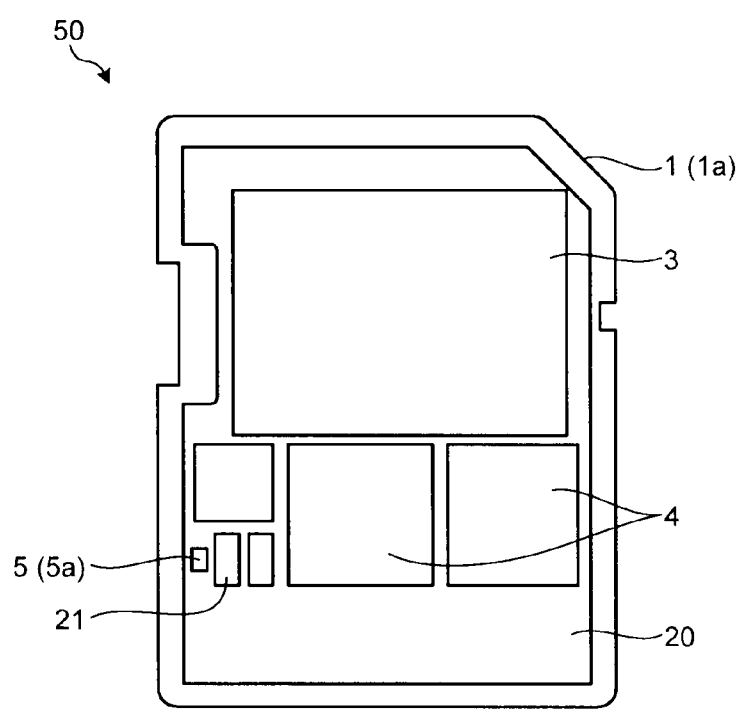
FIG. 2 is a plan view illustrating the semiconductor memory device in a state where an upper case is removed.
Figure 3:
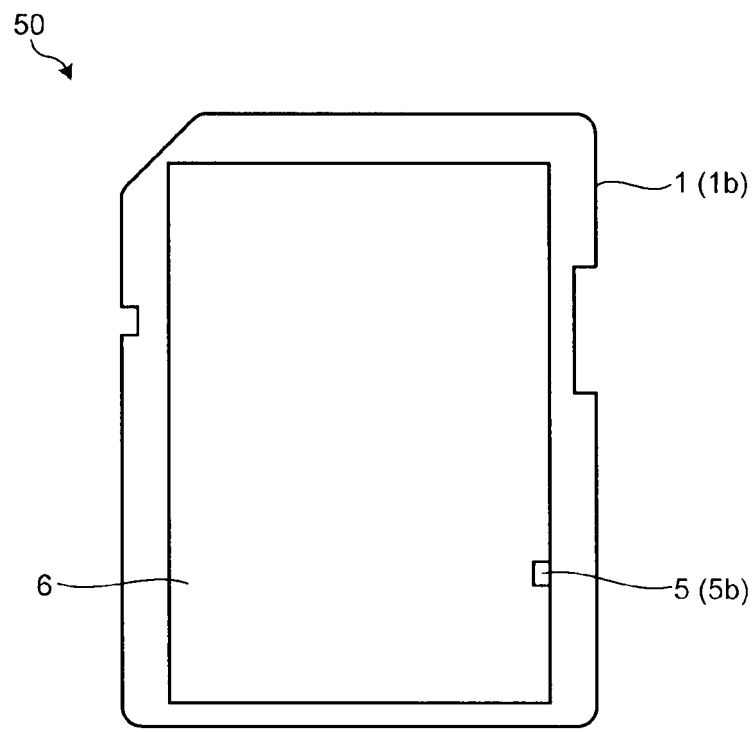
FIG. 3 is a diagram of the upper case viewed from an inner surface side.
Figure 4:
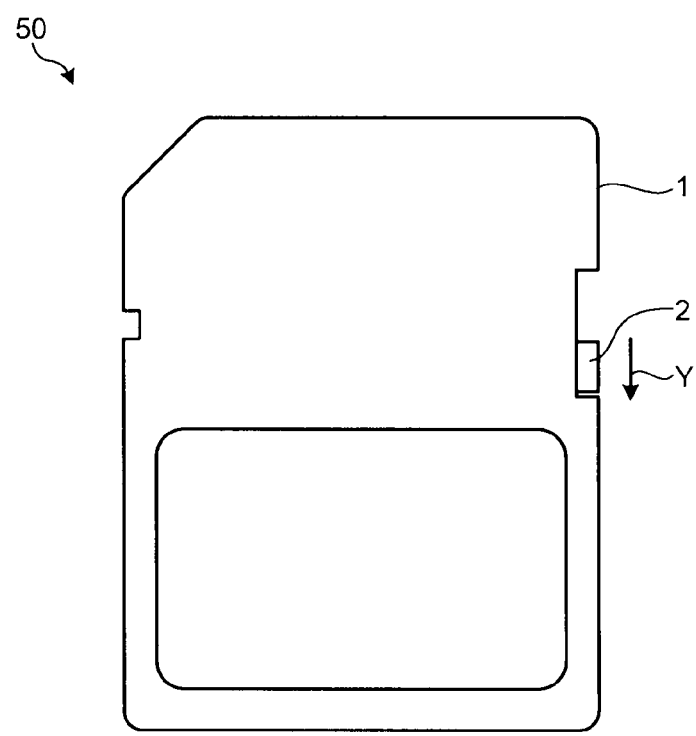
FIG. 4 is a plan view illustrating the schematic configuration of the semiconductor memory device and is a diagram illustrating a state where wireless communication is permitted.

FIG. 1 is a plan view illustrating a schematic configuration of a semiconductor memory device according to a first embodiment. FIG. 2 is a plan view illustrating the semiconductor memory device in a state where an upper case is removed. FIG. 3 is a diagram of the upper case viewed from an inner surface side. FIG. 4 is a plan view illustrating the schematic configuration of the semiconductor memory device and is a diagram illustrating a state where wireless communication is permitted.

A semiconductor memory device 50 is used as an external memory of a host apparatus (not shown) such as a digital camera. The semiconductor memory device 50 includes a case 1, a substrate 20, a NAND-type flash memory (hereinafter, abbreviated as NAND memory) 3 as a nonvolatile semiconductor memory element, electronic components 4, a radio antenna 6, and a change-over switch (switching unit) 2.

The case 1 forms an outline of the semiconductor memory device 50 and protects the NAND memory 3 and the like provided inside. The case 1 is formed, for example, by using synthetic resin. As shown in FIG. 2 and FIG. 3, the case 1 includes a lower case 1a and an upper case 1b. The lower case 1a and the upper case 1b are superimposed on each other so that the NAND memory 3 and the like are accommodated in the case 1 and are adhered by fusion or the like to form the semiconductor memory device 50.

The NAND memory 3 and the electronic components 4 are mounted on one surface side of the substrate 20. The electronic components 4, for example, include a capacitor and a resistor. The substrate 20 has a multilayered structure formed by laminating synthetic resin and, for example, has an eight-layer structure. The number of layers of the substrate 20 is not limited to eight layers. In the substrate 20, wiring patterns having various shapes are formed on a surface of each layer or an inner layer made of synthetic resin. Components, such as the NAND memory 3 and the electronic components 4, mounted on the substrate 20 are electrically connected via the wiring patterns formed on the substrate 20. Although not shown, an input/output terminal to be brought into contact with a terminal on the host apparatus side is also formed in the substrate 20. This input/output terminal is also electrically connected to the NAND memory 3 and the like via the wiring patterns.

As shown in FIG. 3, the radio antenna 6 is provided on the inner surface side of the upper case 1b. The semiconductor memory device 50 performs transmission and reception of information by performing wireless communication between the host apparatus (for example, digital camera) on which the semiconductor memory device 50 is mounted and a different host apparatus (for example, personal computer (hereinafter, abbreviated as PC)) via the radio antenna 6.

The radio antenna 6 is configured by attaching a copper thin film substrate to the inner surface side of the upper case 1b. In FIG. 3, the shape of the radio antenna 6 is illustrated as a simple planar shape, however, it is not limited thereto and various shapes can be applied. Moreover, as the radio antenna 6, a sheet-shaped one, such as a thin film substrate, or a bar-shaped one, such as a rod antenna, may be used. Moreover, the radio antenna 6 may be buried in the case 1.

For example, information stored in the NAND memory 3 is transmitted to a different host apparatus by wireless communication by the semiconductor memory device 50. The NAND memory 3 and the radio antenna 6 need to be electrically connected for performing such wireless communication. Thus, the semiconductor memory device 50 includes an antenna connection terminal 5 for electrically connecting the NAND memory 3 and the radio antenna 6.

The antenna connection terminal 5 is configured to include a substrate-side antenna connection terminal 5a provided on the substrate 20 and a case-side antenna connection terminal 5b provided on the upper case 1b side. The substrate-side antenna connection terminal 5a is electrically connected to the NAND memory 3 via the wiring patterns of the substrate 20. Moreover, the case-side antenna connection terminal 5b is formed directly on the radio antenna 6. Then, the lower case 1a and the upper case 1b are superimposed on each other, so that the substrate-side antenna connection terminal 5a and the case-side antenna connection terminal 5b are brought into contact with each other to electrically connect the radio antenna 6 and the NAND memory 3. Consequently, information stored in the NAND memory 3 can be transmitted to a different host apparatus by wireless communication. The antenna connection terminal 5 is not necessarily provided on both the substrate 20 side and the upper case 1b side. For example, the antenna connection terminal 5 may be directly brought into contact with the radio antenna 6 by providing the antenna connection terminal 5 only on the substrate 20 side and superimposing the lower case 1a and the upper case 1b on each other.

The change-over switch 2 is a so-called write protect switch that inhibits writing of information to the NAND memory 3 via the above input/output terminal. As shown in FIG. 1, when the change-over switch 2 is slid in a direction indicated by an arrow X, writing of information to the NAND memory 3 is permitted. As shown in FIG. 4, when the change-over switch 2 is slid in a direction indicated by an arrow Y, writing of information to the NAND memory 3 is inhibited. A publicly-known configuration is used for the configuration of inhibiting and permitting writing of information to the NAND memory 3 by a write protect switch. Therefore, a detailed explanation of the configuration of inhibiting and permitting writing of information to the NAND memory 3 is omitted.

In the present embodiment, the change-over switch 2 has a function of inhibiting and permitting wireless communication by the semiconductor memory device 50. Specifically, the semiconductor memory device 50 includes a control unit 21 that determines the position of the change-over switch 2 and performs inhibition and permission of writing in a software manner.

Figure 5:
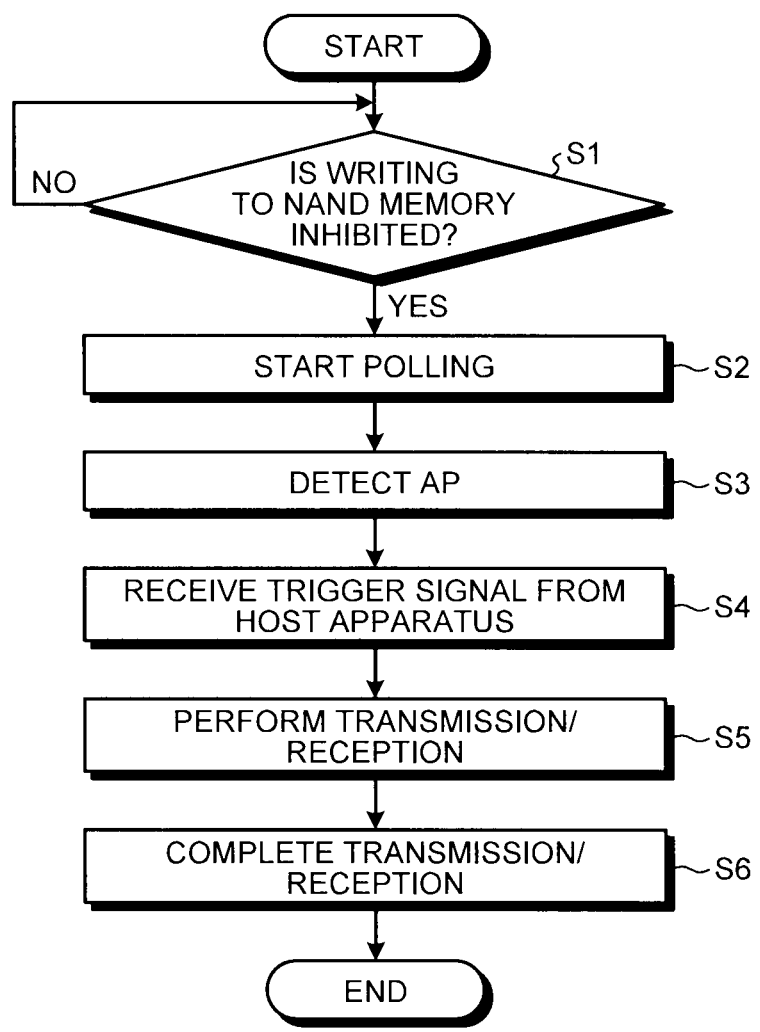
FIG. 5 is a flowchart illustrating a procedure of wireless communication by the semiconductor memory device.

FIG. 5 is a flowchart illustrating a procedure of wireless communication by the semiconductor memory device 50. First, position determination of the change-over switch 2 is performed and, when the change-over switch 2 is at a position at which writing of information to the NAND memory 3 is permitted (No at Step S1), wireless communication is inhibited (return to Step S1 again).

When the change-over switch 2 is at a position at which writing of information to the NAND memory 3 is inhibited (Yes at Step S1), Polling is started (Step S2) and an access point (a different host apparatus, hereinafter, simply described also as AP) as a partner of wireless communication is searched for. Then, if an AP is detected (Step S3), when a trigger signal is received from the host apparatus on which the semiconductor memory device 50 is mounted (Step S4), transmission and reception of information by wireless communication is performed (Step S5) and is completed (Step S6). These processes are performed by the control unit 21.

The trigger signal from the host apparatus is transmitted by an operation of the host apparatus by a user. For example, in a case of a host apparatus in which use of a semiconductor memory device having a wireless communication function is predicted in advance, the trigger signal is transmitted when an operation for transmitting and receiving information by wireless communication is performed. Moreover, in a case of a host apparatus in which use of a semiconductor memory device having a wireless communication function is not predicted in advance, for example, the configuration may be such that a signal transmitted when an operation for erasing information stored in the NAND memory 3 is performed is recognized as the trigger signal. With such a configuration, wireless communication by a semiconductor memory device can be performed even in a case of a host apparatus in which use of a semiconductor memory device having a wireless communication function is not predicted in advance, for example, a relatively old host apparatus.

As explained above, in the semiconductor memory device 50 of the present embodiment, when wireless communication is not permitted based on the position of the change-over switch 2, searching for an AP and the like are not performed, so that power consumption due to unnecessary searching for an AP can be suppressed. Consequently, power consumption of a host apparatus when wireless communication is not performed can be suppressed. If a host apparatus is driven by a battery, prolongation of a driving time can be achieved by suppressing power consumption.

Moreover, because wireless communication is permitted when the change-over switch 2 is at a position at which writing of information to the NAND memory 3 is inhibited, information in the NAND memory 3 can be prevented from being rewritten during transmission of the information in the NAND memory 3. Therefore, it is prevented that a FAT table is rewritten and data is destroyed by rewriting of information in the NAND memory 3 during transmission of the information. Consequently, reliability of the semiconductor memory device 50 is improved. For example, when the semiconductor memory device 50 is mounted on a digital camera as the host apparatus, even when an imaging button of the digital camera is operated during transmission of information, writing of new imaging data to the NAND memory 3 is inhibited, so that information in the NAND memory 3 is not rewritten.

Moreover, because the radio antenna 6 is provided on the case 1 (upper case 1*b*), design freedom in shape and size can be improved compared with a case of providing the radio antenna 6 as part of the wiring patterns of the substrate 20. In other words, the radio antenna 6 employs a larger and more preferable shape easily, so that a wireless communication function is easily improved. Moreover, the wiring patterns are reduced in size by providing the radio antenna 6 on the case 1 and therefore the substrate 20 can be reduced in size in some cases, so that the cost can be suppressed due to reduction of a use material and the apparatus can be reduced in size.

Figure 6:
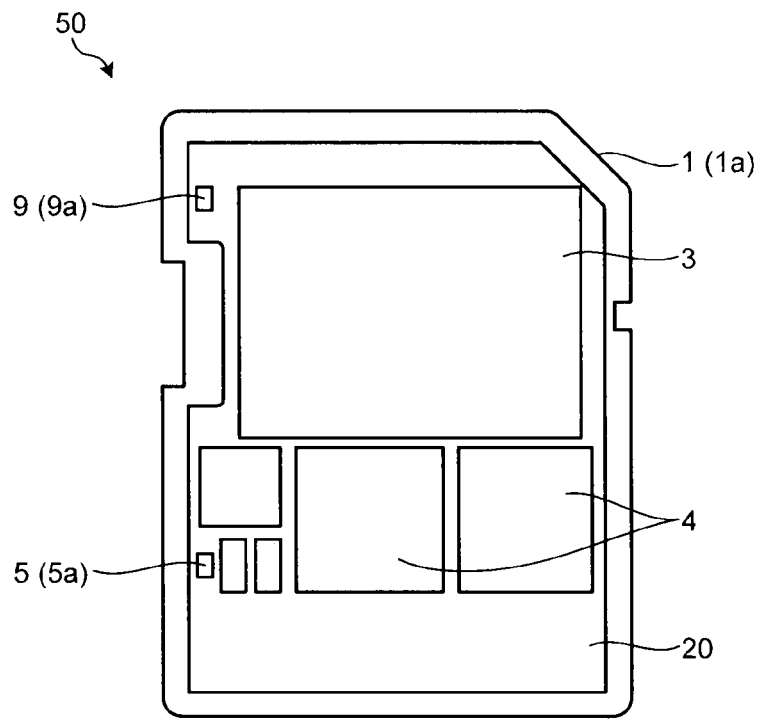
FIG. 6 is a diagram illustrating a semiconductor memory device according to a first modified example of the first embodiment in a state where an upper case is removed.
Figure 7:
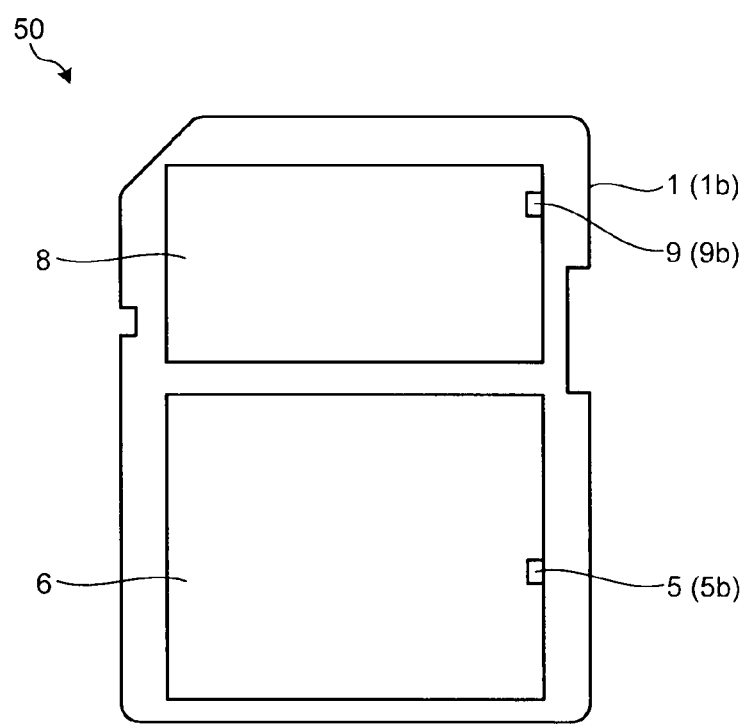
FIG. 7 is a diagram of the upper case of the semiconductor memory device shown in FIG. 6 viewed from an inner surface side.

FIG. 6 is a diagram illustrating the semiconductor memory device 50 according to a first modified example of the first embodiment in a state where the upper case 1*b* is removed. FIG. 7 is a diagram of the upper case 1*b* of the semiconductor memory device 50 shown in FIG. 6 viewed from an inner surface side.

In the first modified example, as shown in FIG. 7, an antenna ground 8 for wireless communication is provided on the inner surface side of the upper case 1*b*. The antenna ground 8 is configured by attaching a copper thin film substrate to the inner surface side of the upper case 1*b*. In FIG. 7, the shape of the antenna ground is illustrated as a simple planar shape, however, it is not limited thereto and various shapes can be applied. In the present modified example, the radio antenna 6 is also provided on the inner surface side of the upper case 1*b*.

Moreover, a ground connection terminal 9 for electrically connecting the wiring patterns of the substrate 20 and the antenna ground 8 is provided. The ground connection terminal 9 is configured to include a substrate-side ground connection terminal 9*a* provided on the substrate 20 and a case-side ground connection terminal 9*b* provided on the upper case 1*b*. The substrate-side ground connection terminal 9*a* is electrically connected to the wiring patterns of the substrate 20. The case-side ground connection terminal 9*b* is provided directly on the antenna ground 8. The lower case 1*a* and the upper case 1*b* are superimposed on each other and are adhered by fusion or the like, so that the substrate-side ground connection terminal 9*a* and the case-side ground connection terminal 9*b* are brought into contact with each other.

The antenna ground 8 is provided on the case 1 (upper case 1*b*), so that design freedom in shape and size can be improved compared with a case of providing the antenna ground 8 as part of the wiring patterns of the substrate 20. In other words, the antenna ground 8 employs a larger and more preferable shape easily, so that a wireless communication function is easily improved.

Moreover, the wiring patterns of the substrate 20 are further reduced in size by providing the antenna ground 8 on the case 1 in addition to the radio antenna 6, so that the substrate 20 can be further reduced in size in some cases. The cost can be further suppressed due to reduction of a use material and the apparatus can be further reduced in size.

Figure 8:
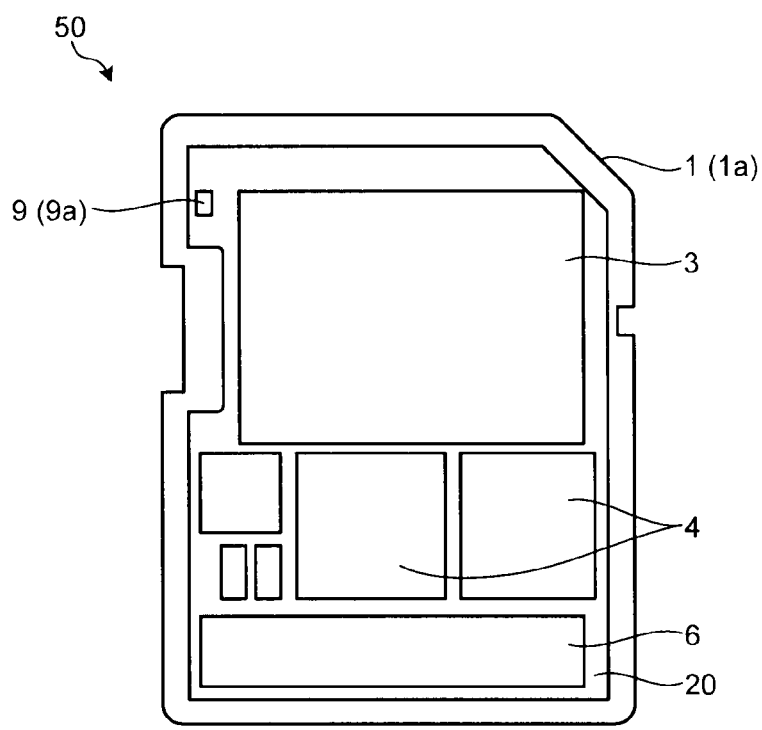
FIG. 8 is a diagram illustrating a semiconductor memory device according to a second modified example of the first embodiment in a state where an upper case is removed.
Figure 9:
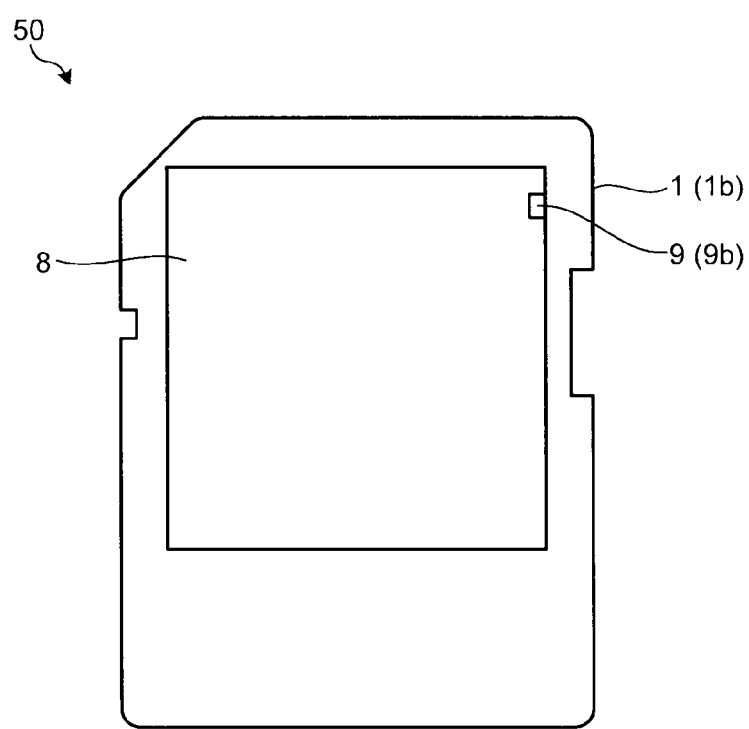
FIG. 9 is a diagram of the upper case of the semiconductor memory device shown in FIG. 8 viewed from an inner surface side.

FIG. 8 is a diagram illustrating a semiconductor memory device according to a second modified example of the first embodiment in a state where the upper case is removed. FIG. 9 is a diagram of the upper case of the semiconductor memory device shown in FIG. 8 viewed from an inner surface side.

In the second modified example, the antenna ground 8 is provided on the inner surface side of the upper case 1*b* and the radio antenna 6 is provided as the wiring patterns of the substrate 20. In this manner, the antenna ground 8 easily employs a larger and more preferable shape compared with the example shown in the first modified example by providing the antenna ground 8 on the case 1 (upper case 1*b*) without providing the radio antenna 6, so that a wireless communication function can be improved from the side of the antenna ground 8.

Figure 10:
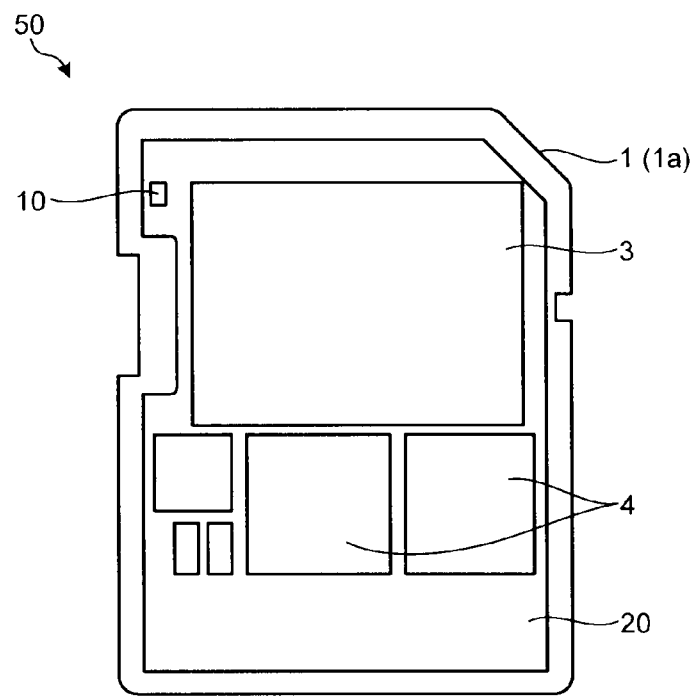
FIG. 10 is a diagram illustrating a semiconductor memory device according to a third modified example of the first embodiment in a state where an upper case is removed.
Figure 11:
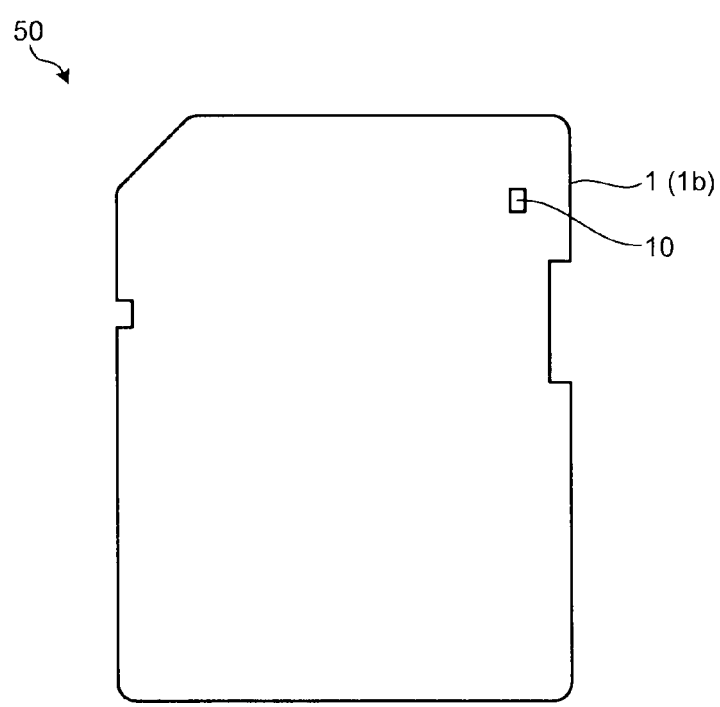
FIG. 11 is a diagram of the upper case of the semiconductor memory device shown in FIG. 10 viewed from an inner surface side.

FIG. 10 is a diagram illustrating the semiconductor memory device 50 according to a third modified example of the first embodiment in a state where the upper case 1*b* is removed. FIG. 11 is a diagram of the upper case 1*b* of the semiconductor memory device shown in FIG. 10 viewed from an inner surface side.

In the third modified example, at least part of the upper case 1*b* is made of a material having a higher conductivity than the substrate 20 to cause the upper case 1*b* itself to function as a radio antenna. For example, the upper case 1*b* may be made of metal, the surface of the upper case 1*b* may be plated with metal, or metal may be deposited on the surface of the upper case 1*b*. Then, an antenna connection terminal 10 is provided on a portion made of a high conductivity material in the upper case 1*b*, for example, a plated portion to be electrically connected to the wiring patterns of the substrate 20.

With such a configuration, a radio antenna can be formed by using a larger area of the upper case 1*b*. Therefore, a radio antenna employs a larger shape easily, so that a wireless communication function can be improved easily. A larger radio antenna may be formed by forming the lower case 1*a* from a high conductivity material in addition to the upper case 1*b*. Moreover, a portion made of a high conductivity material may be used as an antenna ground. Moreover, any one of the lower case 1*a* and the upper case 1*b* may be used as a radio antenna and the other case may be used as an antenna ground.

Figure 12:
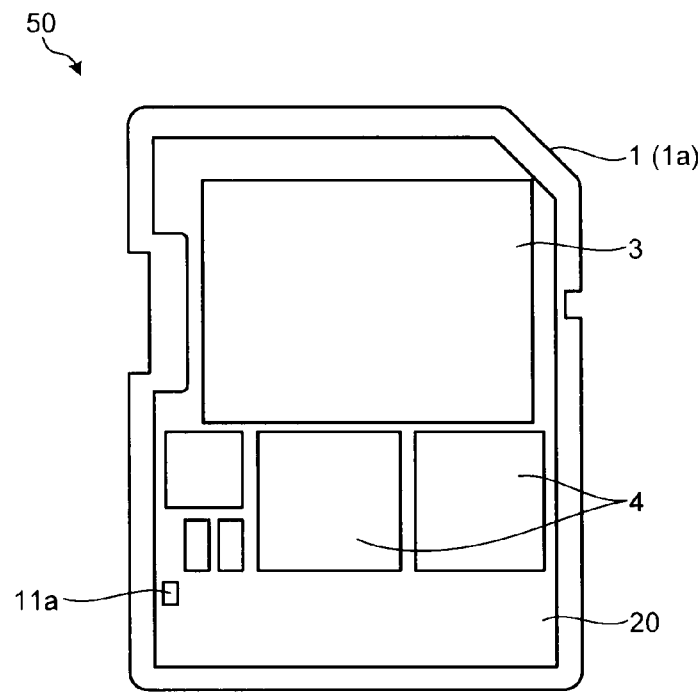
FIG. 12 is a diagram illustrating a semiconductor memory device according to a fourth modified example of the first embodiment in a state where an upper case is removed.
Figure 13:
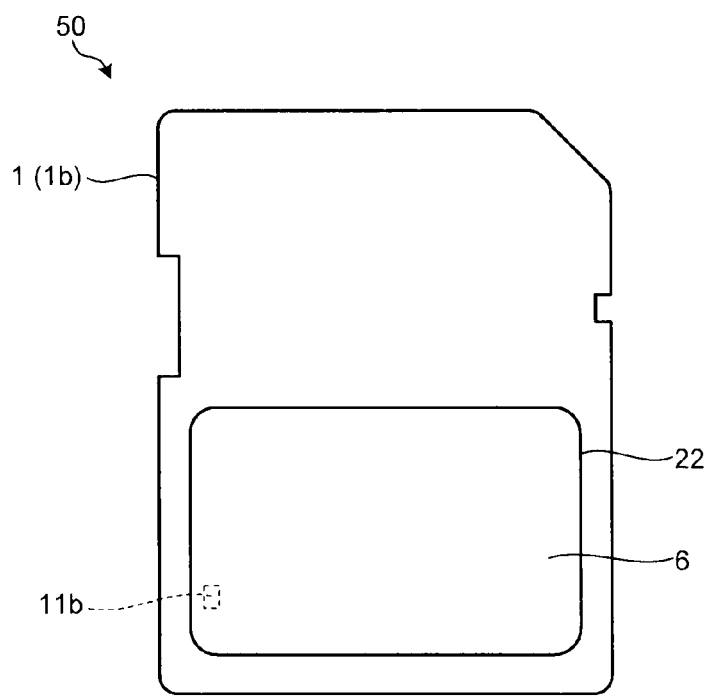
FIG. 13 is a diagram of the upper case of the semiconductor memory device shown in FIG. 12 viewed from an outer surface side.

FIG. 12 is a diagram illustrating the semiconductor memory device 50 according to a fourth modified example of the first embodiment in a state where the upper case 1*b* is removed. FIG. 13 is a diagram of the upper case 1*b* of the semiconductor memory device 50 shown in FIG. 12 viewed from an outer surface side.

In the semiconductor memory device 50, a seal 22 is put on the outer side surface of the case 1 in some cases to indicate a memory capacity and a manufacturer of the semiconductor memory device 50. In the fourth modified example, the seal 22 is used as the radio antenna 6 by forming the seal 22 from a material having a higher conductivity than the substrate 20. Then, a case-side antenna connection terminal 11*b*, which is in contact with the radio antenna 6, is provided to penetrate through the upper case 1*b* thereby bringing it into contact with a substrate-side antenna connection terminal 11*a*. In this manner, the cost can be suppressed compared with a case of separately providing a radio antenna, by using the seal 22 as the radio antenna 6.

Figure 14:
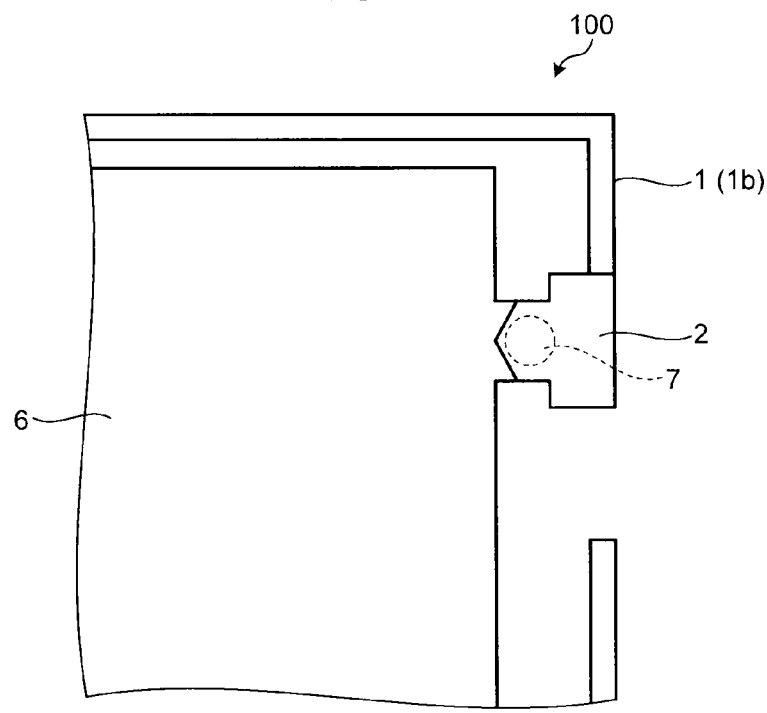
FIG. 14 is a partially enlarged view of a change-over switch portion of a semiconductor memory device according to a second embodiment and is a diagram illustrating a state where wireless communication is inhibited.
Figure 15:
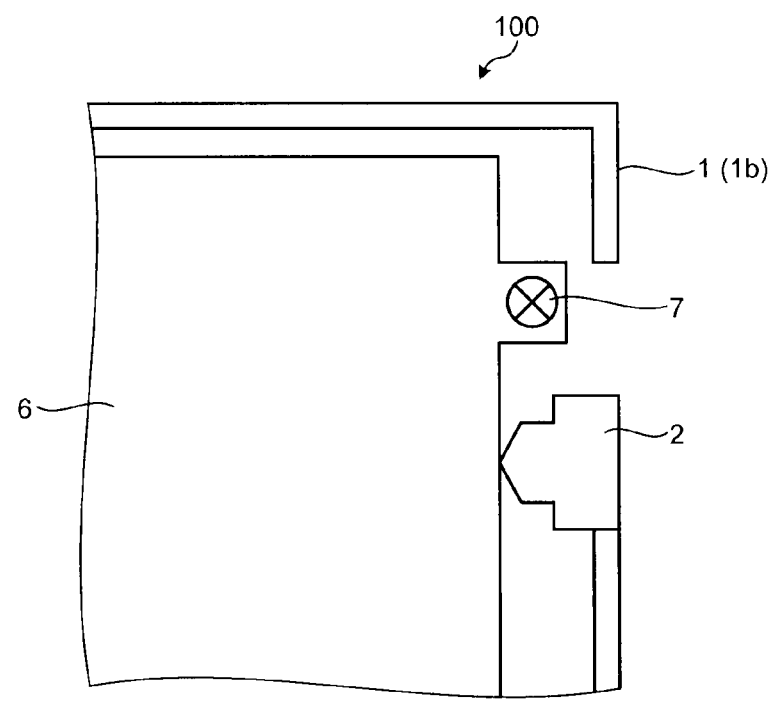
FIG. 15 is a partially enlarged view of the change-over switch portion of the semiconductor memory device shown in FIG. 14 and is a diagram illustrating a state where wireless communication is permitted.

FIG. 14 is a partially enlarged view of a change-over switch portion of a semiconductor memory device according to the second embodiment and is a diagram illustrating a state where wireless communication is inhibited. FIG. 15 is a partially enlarged view of the change-over switch portion of the semiconductor memory device shown in FIG. 14 and is a diagram illustrating a state where wireless communication is permitted. The configurations similar to the above embodiment are denoted by the same reference numerals and a detailed explanation thereof is omitted.

In the above first embodiment, permission and inhibition of wireless communication is processed in a software manner, however, a semiconductor memory device 100 in the second embodiment physically processes permission and inhibition of wireless communication.

In the second embodiment, connection between the radio antenna 6 and the wiring patterns of the substrate is physically interrupted by using the change-over switch 2. As shown in FIG. 15, an antenna contact portion 7, which brings the wiring patterns of the substrate and the radio antenna 6 into contact with each other, is formed in the radio antenna 6. The antenna contact portion 7 is formed of a connector such as a spring-shaped metal terminal and a metal probe, and when there is no shield between the antenna contact portion 7 and the wiring patterns of the substrate, the antenna contact portion 7 comes into contact with the wiring patterns of the substrate to connect the radio antenna 6 and the wiring patterns of the substrate.

In FIG. 15, the change-over switch 2 is located at a position at which writing of information to the NAND memory is inhibited. At this position, the change-over switch 2 does not block between the antenna contact portion 7 and the wiring patterns of the substrate, so that the antenna contact portion 7 comes into contact with the radio antenna 6 and the wiring patterns of the substrate and therefore the radio antenna 6 and the wiring patterns of the substrate are connected via the antenna contact portion 7. Thus, wireless communication is permitted.

On the other hand, in FIG. 14, the change-over switch 2 is located at a position at which writing of information to the NAND memory is permitted. At this position, the change-over switch 2 blocks between the antenna contact portion 7 and the wiring patterns of the substrate and the antenna contact portion 7 is compressed by the change-over switch 2. Because the change-over switch 2 is typically made of insulator such as synthetic resin, the radio antenna 6 and the wiring patterns of the substrate are electrically disconnected to be in a state where wireless communication is inhibited.

In this manner, in the second embodiment, the radio antenna 6 and the wiring patterns of the substrate are disconnected by moving the change-over switch 2 to be in a state where wireless communication is inhibited. Consequently, unnecessary searching for an AP and the like can be suppressed, so that power consumption can be suppressed.

Moreover, when writing of information to the NAND memory is permitted, the radio antenna 6 and the wiring patterns of the substrate are disconnected to inhibit wireless communication. Consequently, data destruction due to data rewriting during wireless communication can be prevented. The antenna contact portion 7 may be provided on the substrate side. The configuration may be such that part of the change-over switch 2 is formed of conductor and, when the change-over switch 2 is at the position shown in FIG. 14, the radio antenna 6 and the wiring patterns of the substrate are connected via the change-over switch, and when the change-over switch 2 is at the position shown in FIG. 15, the radio antenna 6 and the wiring patterns of the substrate are not connected. In this case, it is sufficient to use a connector that does not come into contact with the wiring patterns of the substrate when there is no shield between the connector and the wiring patterns of the substrate, as the antenna contact portion 7.

Figure 16:
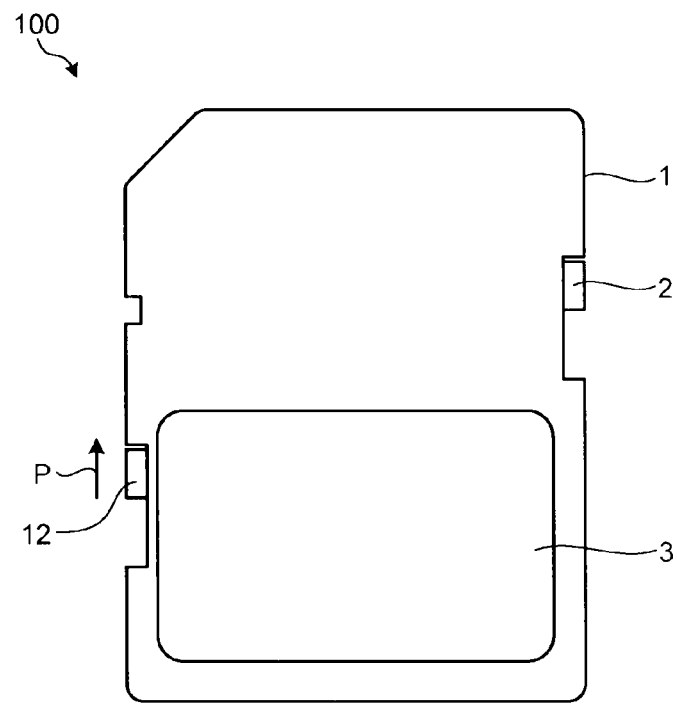
FIG. 16 is a plan view illustrating a schematic configuration of a semiconductor memory device according to a first modified example of the second embodiment.
Figure 17:
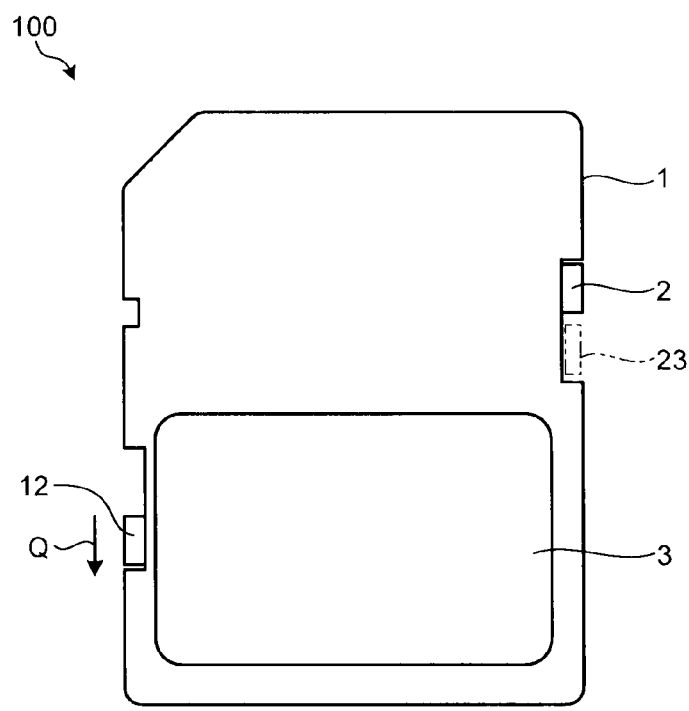
FIG. 17 is a plan view of the semiconductor memory device shown in FIG. 16 and is a diagram illustrating a state where wireless communication is permitted.

FIG. 16 is a plan view illustrating a schematic configuration of the semiconductor memory device 100 according to a first modified example of the second embodiment. FIG. 17 is a plan view of the semiconductor memory device 100 shown in FIG. 16 and is a diagram illustrating a state where wireless communication is permitted.

In the first modified example, a communication change-over switch (switching unit) 12 that switches between permission and inhibition of wireless communication is provided in the semiconductor memory device 100 separately from the change-over switch 2 that switches between permission and inhibition of writing of information to the NAND memory. As shown in FIG. 16, wireless communication can be inhibited by sliding the communication change-over switch 12 in a direction indicated by an arrow P. Moreover, as shown in FIG. 17, wireless communication can be permitted by sliding the communication change-over switch 12 in a direction indicated by an arrow Q. As explained in the first embodiment, permission and inhibition of wireless communication may be switched in a software manner according to the position of the communication change-over switch 12, or as explained in the second embodiment, permission and inhibition of wireless communication may be physically switched.

In this manner, the state where writing of information to the NAND memory 3 is permitted or inhibited and the state where wireless communication is permitted or inhibited can be arbitrary combined by providing the communication change-over switch 12 separately from the change-over switch 2, so that the state can be finely set to suit the needs of a user.

FIG. 16 and FIG. 17 illustrate a state where the change-over switch 2 is located at a position at which writing of information to the NAND memory 3 is permitted. In this state, even if wireless communication is permitted as shown in FIG. 17, rewriting of information in the NAND memory 3 during wireless communication is prevented, so that data destruction can be prevented.

On the other hand, in a state where wireless communication is permitted, if the change-over switch 2 is moved to a position at which writing of information to the NAND memory 3 is permitted, data may be destroyed due to data rewriting during wireless communication. Thus, the configuration may be such that a restricting unit 23, which restricts movement of the change-over switch 2 an the direction indicated by the arrow P, projects when the communication change-over switch 12 is moved in the direction indicated by the arrow Q to avoid a state where wireless communication is permitted and writing of information is permitted, that is, a state where data may be destroyed. Consequently, data destruction due to erroneous operation or erroneous setting by a user is prevented, so that reliability of the semiconductor memory device 100 can be improved.

Figure 18:
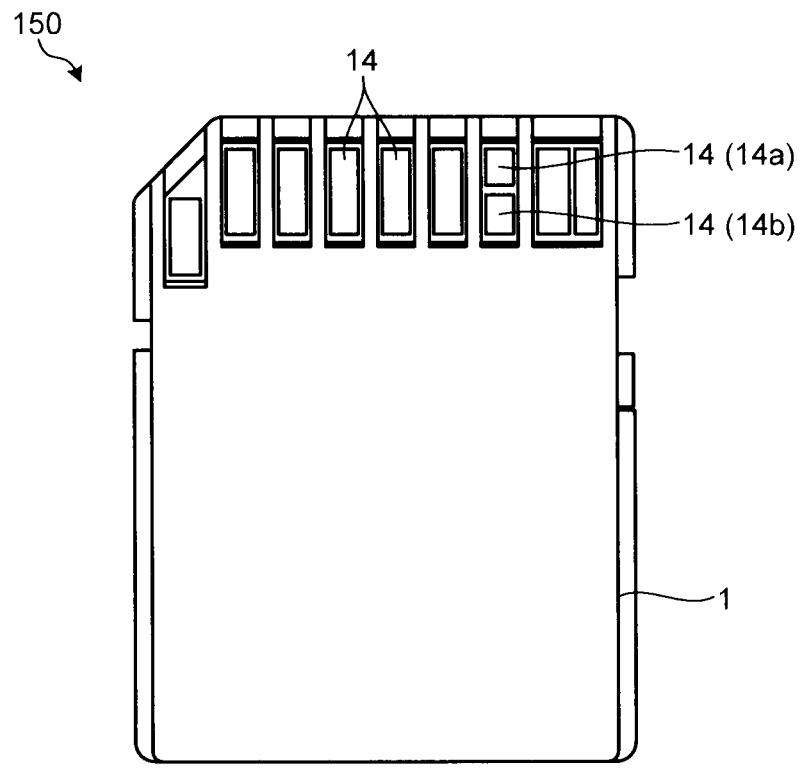
FIG. 18 is a plan view illustrating a schematic configuration of a semiconductor memory device according to a third embodiment.
Figure 19:
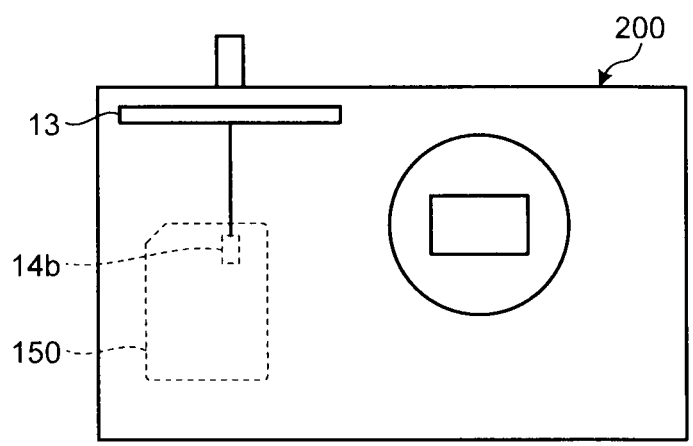
FIG. 19 is a diagram illustrating an example in which the semiconductor memory device shown in FIG. 18 is used as an external memory device of a digital camera.

FIG. 18 is a plan view illustrating a schematic configuration of a semiconductor memory device according to the third embodiment. FIG. 19 is a diagram illustrating an example in which the semiconductor memory device shown in FIG. 18 is used as an external memory device of a digital camera. The configurations similar to the above embodiment are denoted by the same reference numerals and a detailed explanation thereof is omitted.

In the third embodiment, a semiconductor memory device 150 does not include a radio antenna. The semiconductor memory device 150 performs wireless communication by using a radio antenna 13 included in a digital camera 200 as the host apparatus. FIG. 19 illustrates the radio antenna 13 as a rod antenna, however, the shape and the configuration thereof are not limited thereto and various types, such as a thin film substrate, can be used.

The semiconductor memory device 150 includes a plurality of input/output terminals 14 to be brought into contact with terminals of the host apparatus. Some of the input/output terminals 14 are each divided into an input/output unit 14a, which normally functions as an input/output terminal, and an antenna connection unit (antenna connection terminal) 14b connected to the radio antenna 13 included in the digital camera 200.

In this manner, the antenna connection unit 14b enabling wireless communication can be provided without reducing the number of the input/output terminals 14 as a whole by dividing some of the input/output terminals 14 to form the input/output units 14a. Moreover, because wireless communication can be performed without providing a radio antenna in the semiconductor memory device 150 itself, the cost can be suppressed.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the sprit of the inventions. The accompanying claims and their equivalents are intended to cover such forms or modifications as would fall within the scope and spirit of the inventions.

What is claimed is:

1. A semiconductor memory device configured to transmit and receive of information by wireless communication, comprising:
    a radio antenna for performing the wireless communication;
    a nonvolatile semiconductor memory element that stores information to be transmitted and received via the radio antenna;
    a substrate on which the nonvolatile semiconductor memory element is mounted and a wiring pattern to be connected to the nonvolatile semiconductor memory element is formed; and
    a switching unit that switches between a state where the wireless communication is permitted and a state where the wireless communication is rejected;
    a change-over switch movable to a position at which writing of information to the nonvolatile semiconductor memory element is permitted and a position at which the writing is rejected, wherein the switching unit is a control unit that, when the change-over switch is at the position at which the writing of information to the nonvolatile semiconductor memory element is permitted, switches to a state where the wireless communication is rejected, and, when the change-over switch is at the position at which the writing of information to the nonvolatile semiconductor memory element is rejected, switches to a state where the wireless communication is permitted.

2. The semiconductor memory device according to claim 1, further comprising a case that accommodates the substrate, wherein
    the radio antenna is provided in the case.

3. The semiconductor memory device according to claim 2, wherein the radio antenna has a sheet-like shape and is attached to an inner side of the case.

4. The semiconductor memory device according to claim 1, further comprising a case that accommodates the substrate, wherein
    at least part of the case is made of a material having a higher conductivity than the substrate and the case itself functions as a radio antenna.

5. The semiconductor memory device according to claim 4, wherein the case is made of metal.

6. The semiconductor memory device according to claim 4, wherein the material having a higher conductivity than the substrate is metal plated on a surface of the case.

7. The semiconductor memory device according to claim 1, further comprising:
    a case that accommodates the substrate; and
    a ground that is provided in the case and is electrically connected to the wiring pattern.

8. The semiconductor memory device according to claim 7, wherein the ground is formed of a thin film substrate and is attached to an inner side of the case.

9. The semiconductor memory device according to claim 1, wherein the nonvolatile semiconductor memory element is a NAND flash memory.

10. The semiconductor memory device according to claim 1, further comprising a control unit that searches for an access point to be a partner of the wireless communication in a state where writing of information to the nonvolatile semiconductor memory element is inhibited.

11. The semiconductor memory device according to claim 1, wherein the wireless communication is performed when a trigger signal from a host apparatus on which the semiconductor memory device is mounted is received.

12. The semiconductor memory device according to claim 11, wherein the trigger signal is a signal that erases information stored in the nonvolatile semiconductor memory element.

13. A semiconductor memory device configured to transmit and receive of information by wireless communication, comprising:
    a radio antenna for performing the wireless communication;
    a nonvolatile semiconductor memory element that stores information to be transmitted and received via the radio antenna;
    a substrate on which the nonvolatile semiconductor memory element is mounted and a wiring pattern to be connected to the nonvolatile semiconductor memory element is formed; and
    a switching unit that switches between a state where the wireless communication is permitted and a state where the wireless communication is rejected;
    wherein the switching unit is a change-over switch movable to a position at which writing of information to the nonvolatile semiconductor memory element is permitted and a
position at which the writing is rejected, and the change-over switch disconnects between the radio antenna and the wiring pattern at the position at which the writing of information to the nonvolatile semiconductor memory element is permitted, and connects the radio antenna and the wiring pattern at the position at which the writing of information to the nonvolatile semiconductor memory element is rejected.

14. A semiconductor memory device configured to transmit and receive of information by wireless communication, comprising:
    a radio antenna for performing the wireless communication;
    a nonvolatile semiconductor memory element that stores information to be transmitted and received via the radio antenna;

a substrate on which the nonvolatile semiconductor memory element is mounted and a wiring pattern to be connected to the nonvolatile semiconductor memory element is formed; and
a switching unit that switches between a state where the wireless communication is permitted and a state where the wireless communication is rejected;
a change-over switch movable to a position at which writing of information to the nonvolatile semiconductor memory element is permitted and a position at which the writing is rejected, wherein the switching unit is a communication change-over switch movable to a position at which the wireless communication is permitted and a position at which the wireless communication is rejected, and the semiconductor memory device further includes a restricting unit that, when the communication change-over switch is at the position at which the wireless communication is permitted, restricts the change-over switch from moving to the position at which the writing of information to the nonvolatile semiconductor memory element is permitted.

15. A semiconductor memory device configured to transmit and receive of information by wireless communication, comprising:
an antenna connection terminal connected to a radio antenna included in a host apparatus on which the semiconductor memory device is mounted;
a nonvolatile semiconductor memory element that stores information to be transmitted and received via the radio antenna;
a substrate on which the nonvolatile semiconductor memory element is mounted and a wiring pattern to be connected to the nonvolatile semiconductor memory element is formed; and
an input/output terminal that enables transmission and reception of information to and from the host apparatus via the wiring pattern;
a switching unit that switches between a state where the wireless communication is permitted and a state where the wireless communication is rejected;
a change-over switch movable to a position at which writing of information to the nonvolatile semiconductor memory element is permitted and a position at which the writing is rejected, wherein the switching unit is a control unit that, when the change-over switch is at the position at which the writing of information to the nonvolatile semiconductor memory element is permitted, switches to a state where the wireless communication is rejected, and, when the change-over switch is at the position at which the writing of information to the nonvolatile semiconductor memory element is rejected, switches to a state where the wireless communication is permitted.

16. The semiconductor memory device according to claim 15, further comprising a communication switching unit that switches between a state where the wireless communication is permitted and a state where the wireless communication is rejected.

17. The semiconductor memory device according to claim 15, wherein the nonvolatile semiconductor memory element is a NAND flash memory.

18. The semiconductor memory device according to claim 15, wherein the wireless communication is performed when a trigger signal from a host apparatus on which the semiconductor memory device is mounted is received.

19. The semiconductor memory device according to claim 18, wherein the trigger signal is a signal that erases information stored in the nonvolatile semiconductor memory element.

* * * * *